United States Patent
Guo et al.

(10) Patent No.: US 7,426,740 B2
(45) Date of Patent: Sep. 16, 2008

(54) OPTICAL RECORDING/REPRODUCING APPARATUS

(75) Inventors: Bin-Hai Guo, Shenzhen (CN); Li-Ming Wan, Shenzhen (CN); Zhi-Guo Chen, Shenzhen (CN)

(73) Assignees: Hong Fu Jin Precision Industry (Shenxhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 502 days.

(21) Appl. No.: 11/021,386

(22) Filed: Dec. 23, 2004

(65) Prior Publication Data

US 2005/0289573 A1  Dec. 29, 2005

(30) Foreign Application Priority Data

Jun. 25, 2004  (CN) .................. 2004 2 0071119 U

(51) Int. Cl.
*G11B 33/14*  (2006.01)

(52) U.S. Cl. .................................... 720/648

(58) Field of Classification Search ............ 720/648, 720/646, 647, 649, 652, 601, 610, 613; 360/99.02, 360/99.06; 369/75.2
See application file for complete search history.

(56) References Cited

U.S. PATENT DOCUMENTS

| | | | | |
|---|---|---|---|---|
| 5,265,072 A | * | 11/1993 | Numata et al. | 720/649 |
| 5,524,104 A | * | 6/1996 | Iwata et al. | 720/652 |
| 5,648,882 A | * | 7/1997 | Tangi et al. | 360/99.06 |
| 5,701,216 A | * | 12/1997 | Yamamoto et al. | 360/99.02 |
| 5,892,747 A | * | 4/1999 | Okada et al. | 720/647 |
| 6,061,204 A | | 5/2000 | Tong | |
| 6,094,323 A | | 7/2000 | Tong | |
| 2002/0051418 A1 | * | 5/2002 | Takahashi et al. | 369/75.2 |

FOREIGN PATENT DOCUMENTS

| | | | | |
|---|---|---|---|---|
| JP | 06052613 A | * | 2/1994 | |
| JP | 09091944 A | * | 4/1997 | |
| JP | 2000090536 A | * | 3/2000 | |
| JP | 2003272368 A | * | 9/2003 | |

* cited by examiner

*Primary Examiner*—Tianjie Chen
(74) *Attorney, Agent, or Firm*—Morris Manning Martin LLP; Tim Tingkang Xia, Esq.

(57) ABSTRACT

An optical recording/reproducing apparatus includes a frame defining a space therein to receive operational components of said apparatus, a tray movably received in said space for accepting an optical disc therein; an upper cover attached to said frame beside said space so as to have said accepted optical disc sandwiched between said cover and said tray in said space; a front panel attached to said frame beside said cover and said space, and having an opening formed in a moving path of said tray to have said tray movable through said opening; and a blocking strip firmly attached to said frame and separate from said cover and said panel, a lower edge of said blocking strip is nearly close with a top surface of the tray, said blocking strip extending beside said moving path of said tray along a direction essentially perpendicular to said moving path.

12 Claims, 6 Drawing Sheets

OPTICAL RECORDING/REPRODUCING APPARATUS

BACKGROUND OF THE INVENTION

1. Field of the Invention

The present invention relates to optical recording/reproducing apparatuses, and more particularly to an optical recording/reproducing apparatus which can prevent damage caused by a broken optical disc.

2. Description of the Prior Art

An optical recording/reproducing apparatus has become a standard feature of a personal computer system, for recording information and/or playing music and/or video recordings. A typical optical recording/reproducing apparatus can be used with media such as CD-ROMs (Compact Disc Read Only Memories), CD-RWs (Compact Disc Rewritables), and DVD-ROMs (Digital Disc Read Only Memories).

The fast development of information technology has helped to greatly advance the technology of optical recording/reproducing apparatuses. One important development has been the significant increase in the speed at which an optical disc in an optical recording/reproducing apparatus rotates. In FIG. 6, a schematic, cross-sectional view of part of a conventional optical recording/reproducing apparatus is shown. An optical disc 100 is held in a disc tray 200. A front edge of an upper cover 300 is directly engaged in a groove defined in a back of a front panel 400. A tray panel 500 is located in a tray opening 600. One drawback of the optical recording/reproducing apparatus is that it can be dangerous in certain circumstances. The optical disc 100 rotates at high speed, and if the optical disc 100 is of inferior quality, it is liable to break into pieces. The pieces may fly directly out through a clearance between a lower surface 620 of the tray opening 600 and an upper surface 520 of the tray panel 500, and may damage the tray panel 500 and the front panel 400.

SUMMARY OF THE INVENTION

Accordingly, an object of the present invention is to provide a simple and reliable optical recording/reproducing apparatus.

The optical recording/reproducing apparatus comprises a frame defining a space therein to receive operational components of said apparatus, a tray movably received in said space for accepting an optical disc therein; an upper cover attached to said frame beside said space so as to have said accepted optical disc sandwiched between said cover and said tray in said space; a front panel attached to said frame beside said cover and said space, and having an opening formed in a moving path of said tray to have said tray movable through said opening in order for accepting said optical disc from an outside of said apparatus; and a blocking strip firmly attached to said frame and separate from said cover and said panel, a lower edge of said blocking strip is nearly close with a top surface of the tray, said blocking strip extending beside said moving path of said tray along a direction essentially perpendicular to said moving path so as to block available accesses for said accepted optical disc toward said opening together with said tray in case that said tray is moved into said space of said frame with said accepted optical disc.

BRIEF DESCRIPTION OF THE DRAWINGS

Other objects, advantages and novel features of the present invention will become more apparent from the following detailed description when taken in conjunction with the accompanying drawings, in which.

DETAILED DESCRIPTION OF THE INVENTION

Reference will now be made to the drawings to describe the preferred embodiments of the present invention in detail.

Figure 1:
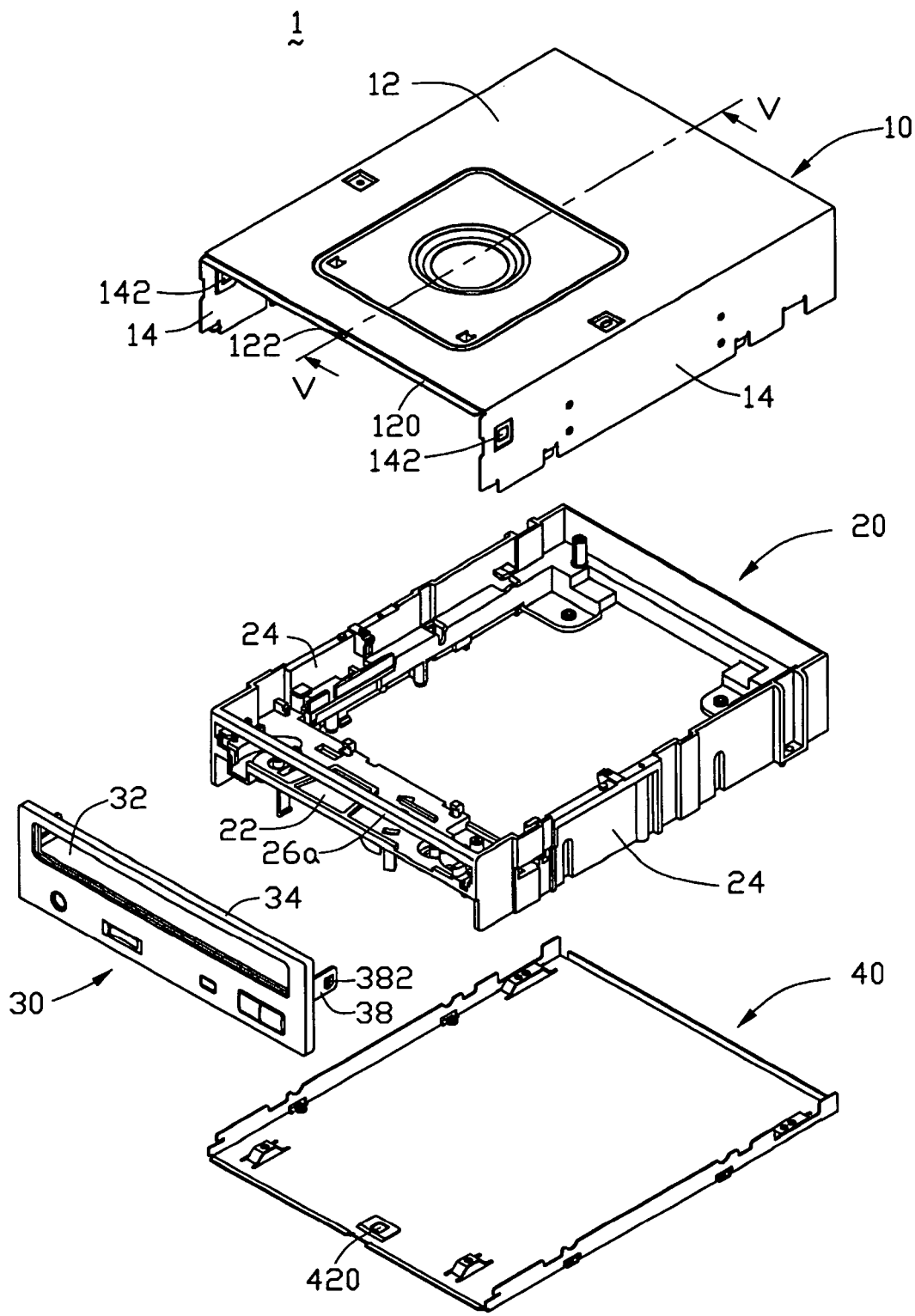
FIG. 1 is an exploded, isometric view of a protection device for an optical recording/reproducing apparatus in accordance with a first embodiment of the present invention.
Figure 5:
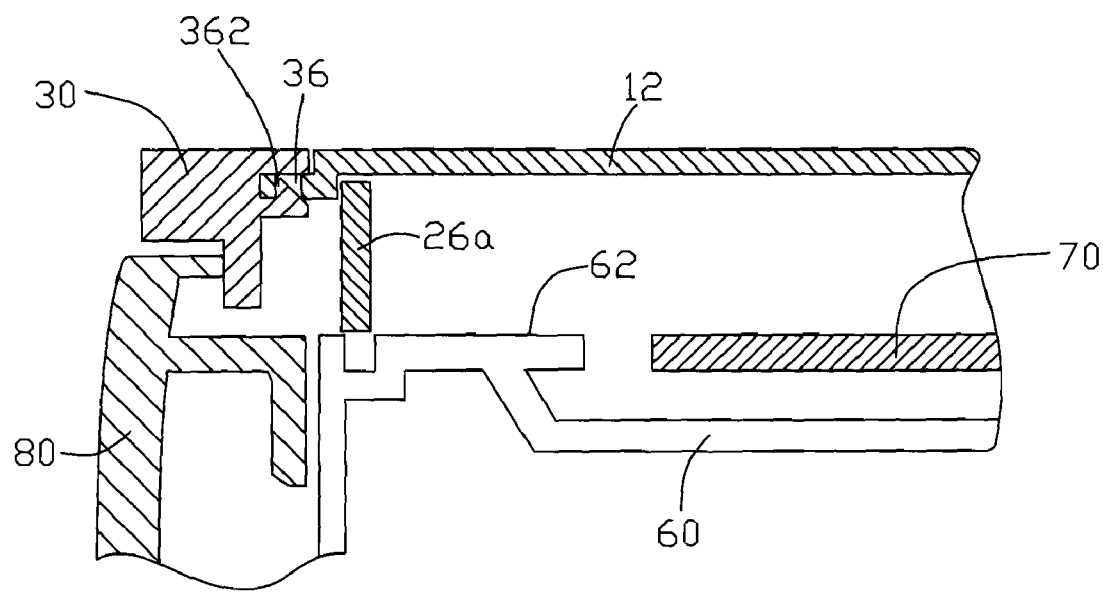
FIG. 5 is an enlarged, cross-sectional view of part of the protection device of FIG. 1 assembled and applied in an optical recording/reproducing apparatus, the view corresponding to line V-V of FIG. 1, and also showing part of an optical disc.
Figure 6:
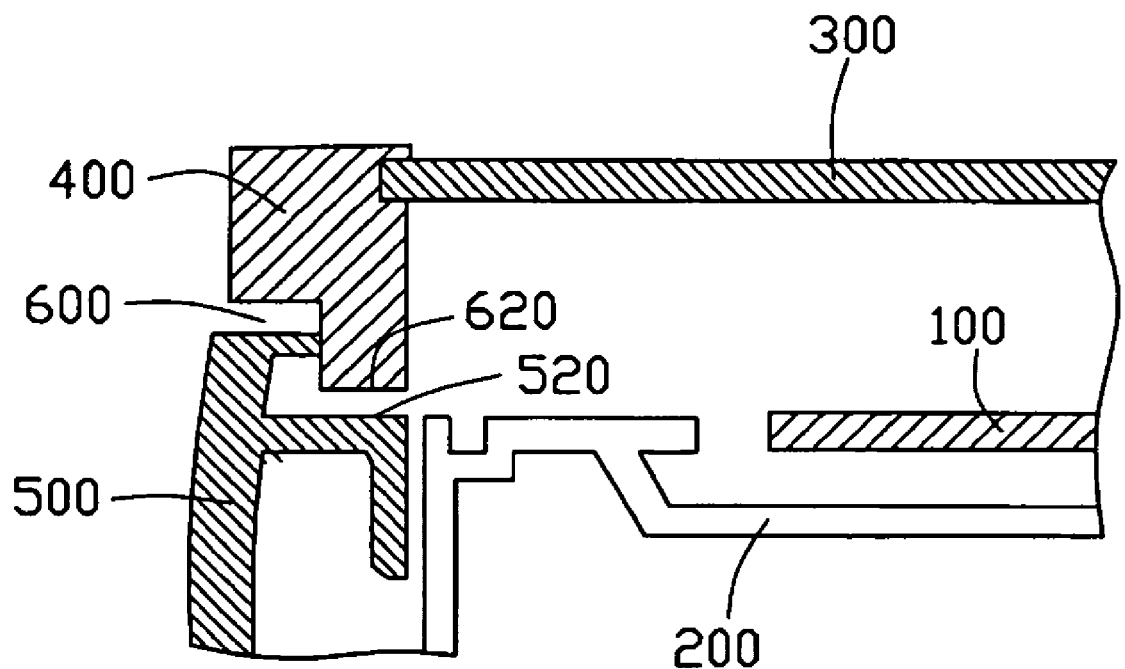
FIG. 6 is a schematic, cross-sectional view of part of a conventional optical recording/reproducing apparatus, also showing part of an optical disc.

FIG. 1 shows a protection device 1 for an optical recording/reproducing apparatus in accordance with the first embodiment of the present invention. The protection device 1 comprises an upper cover 10, a frame 20, a front panel 30, and a lower cover 40. The frame 20 is sealed in a space cooperatively formed by the upper cover 10, the front panel 30, and the lower cover 40. Referring also to FIG. 5, the space is used to receive operational components of the optical recording/reproducing apparatus including a disc tray 60 movably received in the space for accepting optical discs therein, a spindle motor, a transmitting device and a pickup module, etc.

The upper cover 10 is attached to the frame 20 beside the space so as to have the accepted optical disc 70 sandwiched between the upper cover 10 and the disc tray 60 in the space. The upper cover 10 comprises a horizontal top cover 12, and two side walls 14 extending vertically down from the top cover 12. A sealing strip 120 with a first clasping hole 122 in a middle portion thereof extends forwardly from the top cover 12. A pair of second clasping holes 142 is defined in front portions of each of the side walls 14 respectively. The front panel 30 is attached to the frame 20 beside the upper cover 10 and the space, and has a tray opening 32 formed in a moving path of the disc tray 60 to have the disc tray 60 movable through the tray opening 32 in order for accepting the optical disc 70 from an outside of the protection device 1.

The frame 20 comprises a front beam 22 and two parallel side beams 24. The front beam 22 interconnects the side beams 24 at a height approximately midway along heights of the side beams 24. A blocking strip 26a interconnects front upper corners of the side beams 24. A lower edge of the blocking strip 26a is nearly close with a top surface 62 of a disc tray 60. The blocking strip 26a is firmly attached to the frame 20 and separate from the upper cover 10 and the front panel 30. The blocking strip 26a extends beside the moving path of the disc tray 60 along a direction essentially perpendicular to the moving path so as to block available accesses for the accepted optical disc 70 toward the tray opening 32 in case that the disc tray 60 is moved into the space of the frame 20 with the accepted optical disc 70.

Referring to FIG. 5, the front panel 30 further comprises an upper beam 34 bordering a top of the tray opening 32, a horizontal insertion groove 36 in a rear of the upper beam 34, a hook 362 in a middle portion of the insertion groove 36, and three arms 38. The arms 38 extend rearwardly from two opposite sides and a bottom of the front panel 30 respectively. A wedged hook 382 is formed at a distal end of each arm 38. A third clasping hole 420 is defined in a front central portion of the lower cover 40, corresponding to a middle one of the arms 38 of the front panel 30. The arms 38 extend toward the upper cover 10 and the lower cover 40 fixedly engage with corresponding clasping holes 142, 420 by the wedged hooks 382 of each of the arms 38.

Figure 2:
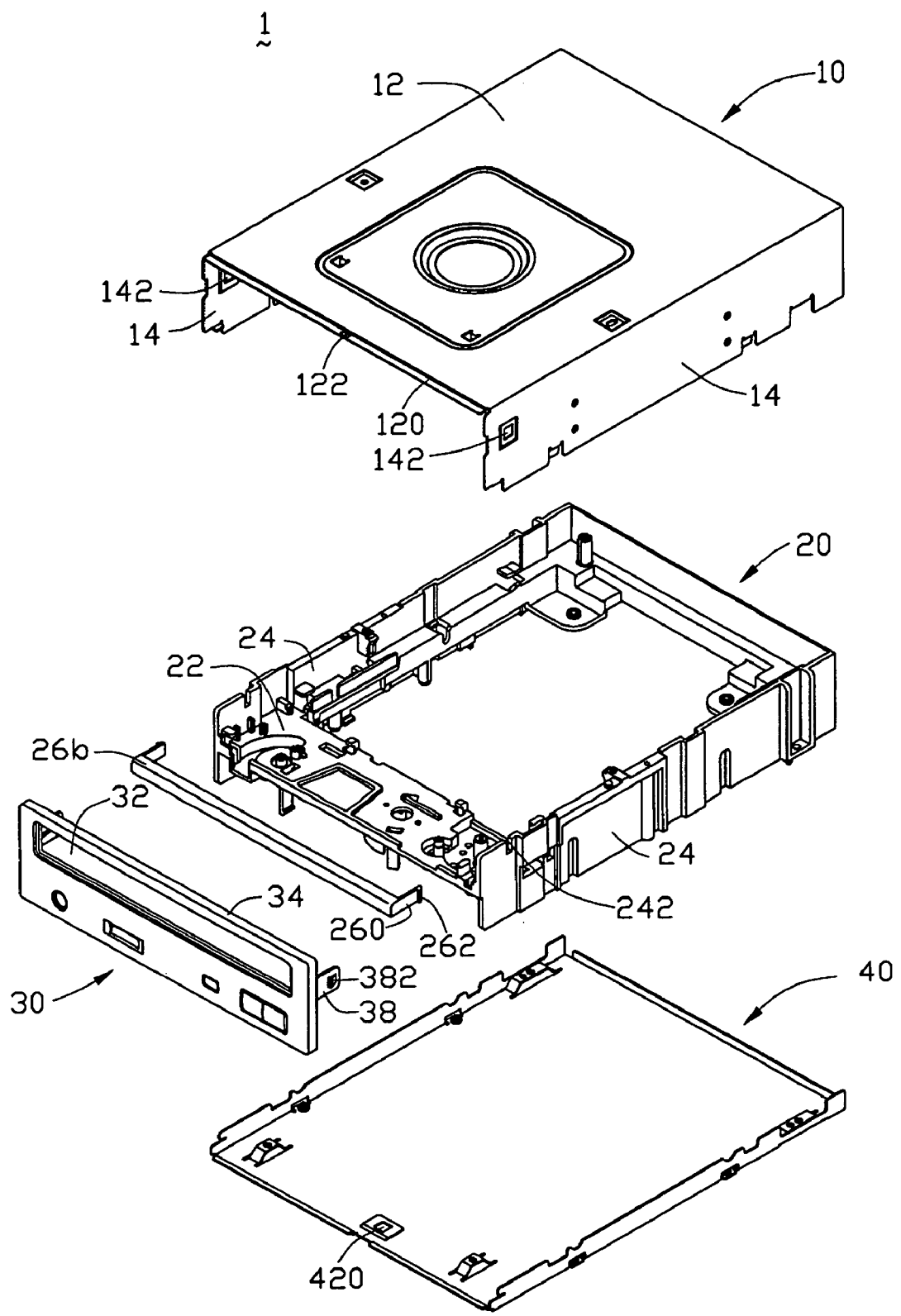
FIG. 2 is an exploded, isometric view of a protection device for an optical recording/reproducing apparatus in accordance with a second embodiment of the present invention.
Figure 3:
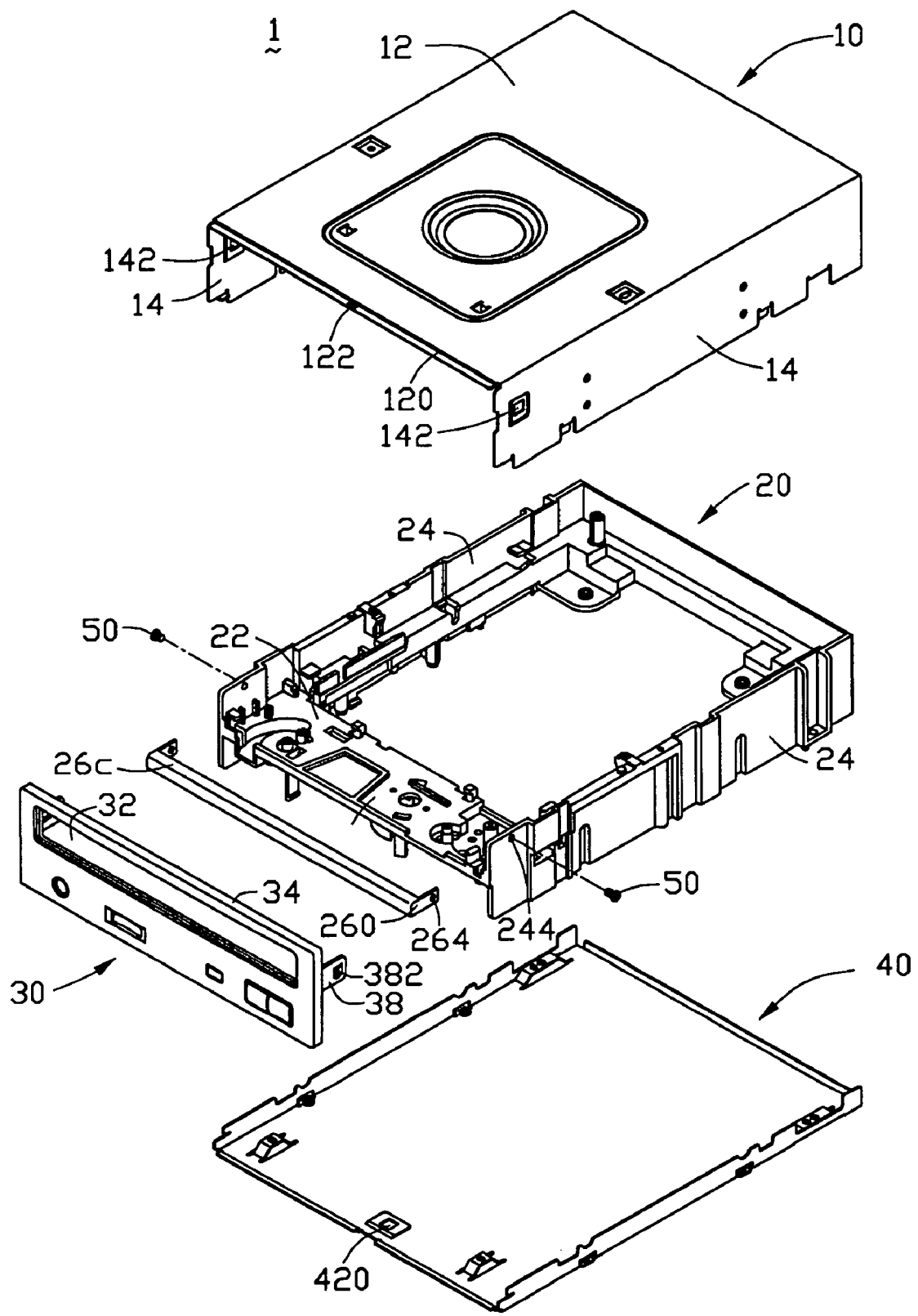
FIG. 3 is an exploded, isometric view of a protection device for an optical recording/reproducing apparatus in accordance with a third embodiment of the present invention.
Figure 4:
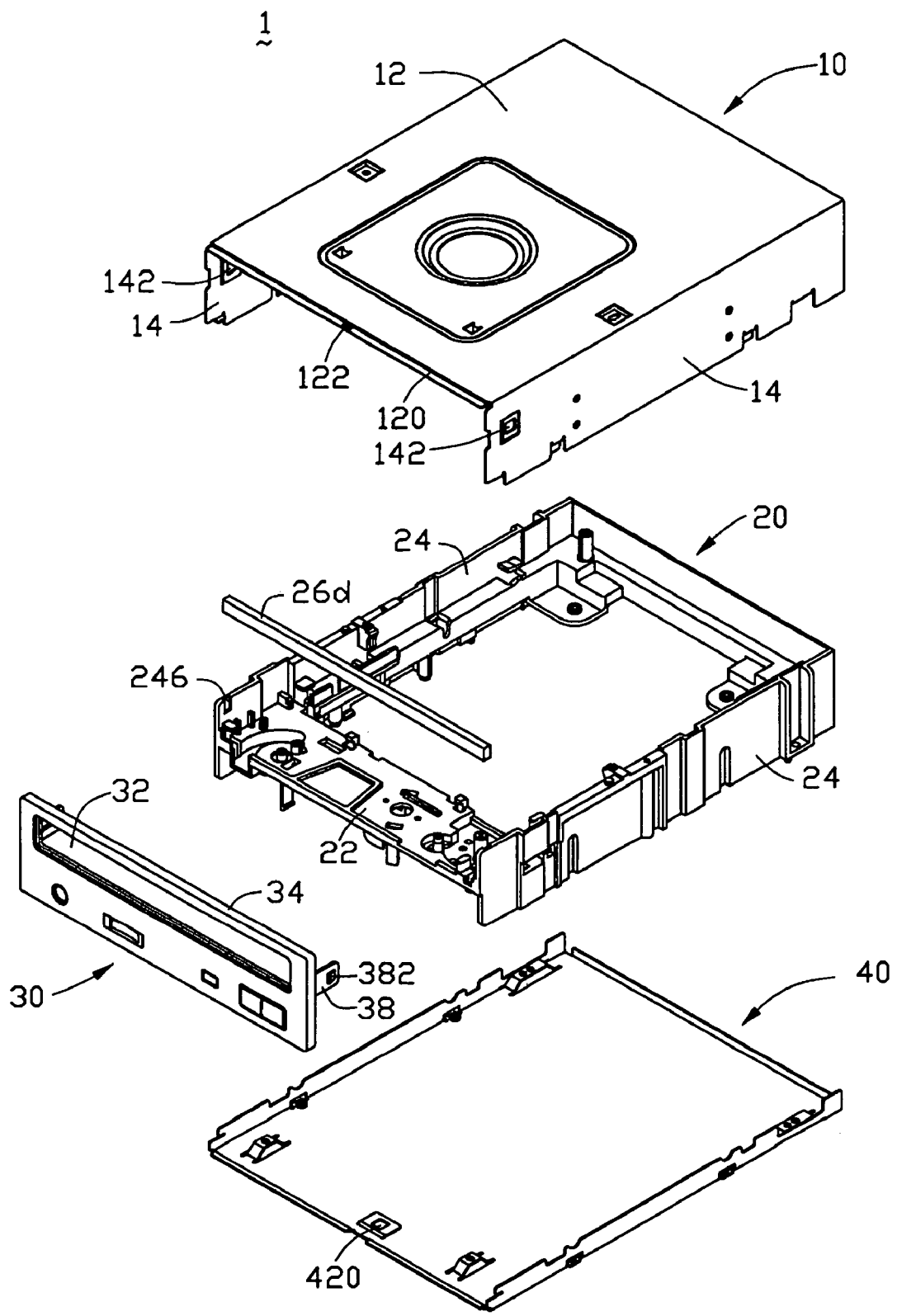
FIG. 4 is an exploded, isometric view of a protection device for an optical recording/reproducing apparatus in accordance with a fourth embodiment of the present invention.

Now referring to FIGS. 2, 3 and 4, the second, third and fourth embodiments of the protection device 1 of the present invention are shown. In the first embodiment, the blocking strip 26a is integrally formed with the frame 20. Unlike the blocking strip 26a of the first embodiment, the second, third and fourth embodiments respectively have blocking strips 26b, 26c, and 26d which are formed separately from the frame 20.

As shown in FIG. 2, in the second embodiment, two mounting arms 260 extend rearward from opposite ends of the blocking strip 26b respectively. Each mounting arm 260 has a claw 262 at a distal end thereof. A pair of clasping grooves 242 is defined in the side beams 24 of the frame 20 respectively, for engagingly receiving the claws 262. Thus the blocking strip 26b can be fixedly claw-clasping engaged with the frame 20.

As shown in FIG. 3, in the third embodiment, instead of having the claws 262 of the second embodiment, a pair of threaded holes 264 is defined in the distal ends of the mounting arms 260 respectively. Instead of having the clasping grooves 242 of the second embodiment, a pair of mounting holes 244 is defined in the side beams 24 respectively, corresponding to the threaded holes 264. Two threaded bolts 50 are extended through the mounting holes 244 and engaged in the threaded holes 264, in order to fixedly screw the blocking strip 26c on the frame 20.

As shown in FIG. 4, in the fourth embodiment, the blocking strip 26d has no mounting arms 260. A pair of vertical mounting slots 246 is defined in inner surfaces of the side beams 24 respectively. Each mounting slot 246 is open at a top end thereof. Opposite ends of the blocking strip 26d are inserted into the mounting slots 246, in order to snugly and partially insertably fit the blocking strip 26d onto the frame 20.

Other parts of the second, third and fourth embodiments of the protection device 1 are similar to corresponding parts of the first embodiment as described above.

In assembly of the protection device 1 of the first through fourth embodiments, in the case of the second through fourth embodiments, the blocking strip 26b, 26c, 26d is fixed to the frame 20. Then, in the case of all the embodiments, the procedure is as follows. The upper cover 10 is attached onto the frame 20. The lower cover 40 is attached onto the frame 20. Lastly, the front panel 30 is attached to the upper cover 10 and the lower cover 40. In this process, the sealing strip 120 of the upper cover 10 is received in the insertion groove 63, with the hook 362 engaging with the first clasping hole 122 of the sealing strip 120. At the same time, the second clasping holes 142 of the side walls 14 and the third clasping hole 420 of the lower cover 40 engagingly receive the wedged hooks 382 of the arms 38 of the front panel 30.

Also referring to FIG. 5, when the protection device 1 is installed in an optical recording/reproducing apparatus, an optical disc 70 is loaded in a disc tray 60. If the optical disc 70 breaks into pieces, the pieces are blocked by the blocking strip 26a from reaching the front panel 30 or a tray panel 80. Further, four sides of the front panel 30 are fixed to the upper cover 10, frame 20 and lower cover 40. Damage or danger caused by flying off of debris is avoided.

Although the present invention has been described with reference to specific embodiments, it should be noted that the described embodiments are not necessarily exclusive, and that various changes and modifications may be made to the described embodiments without departing from the scope of the invention as defined by the appended claims.

What is claimed is:

1. An optical recording/reproducing apparatus, comprising:

a frame defining a space therein to receive operational components of said apparatus, a tray movably received in said space for accepting an optical disc therein;

an upper cover attached to said frame beside said space so as to have said accepted optical disc sandwiched between said cover and said tray in said space after accepting said optical disc;

a front panel attached to said frame beside said cover and said space, and having an opening formed in a moving path of said tray to have said tray movable through said opening in order for accepting said optical disc from an outside of said apparatus; and a blocking strip firmly attached to said frame and separate from said cover and said panel, a lower edge of said blocking strip is nearly close with a top surface of said tray, said blocking strip extending beside said moving path of said tray along a direction essentially perpendicular to said moving path so as to block available accesses for said accepted optical disc toward said opening together with said tray in case that said tray is moved into said space of said frame with said accepted optical disc;

wherein the frame has a front beam and two side beams, the front beam is interconnected the side beams at a height approximately midway along heights of the side beams.

2. The optical recording/reproducing apparatus as recited in claim 1, wherein the blocking strip is attached to the frame via one of a group of methods consisting of being claw-clasping engaged with said frame, being fixedly screwed on said frame and being snugly and partially insertably fitted onto said frame.

3. The optical recording/reproducing apparatus as recited in claim 1, wherein said apparatus further comprises a lower cover defining a clasping hole, an arm with a wedged hook extends rearward from a bottom of the front panel, and the wedged hook is engaged in the clasping hole.

4. An optical recording/reproducing apparatus, comprising:

a frame having a front beam and two side beams, the front beam being interconnected the side beams at a height approximately midway along heights of the side beams, the frame also defining a space therein to movably receive a tray in the space for accepting an optical disc therein;

an upper cover covering the frame beside the space so as to have the accepted optical disc between the upper cover and the tray in the space;

a front panel attached to the frame beside the upper cover and the space, and having an opening formed in a moving path of the tray; and a blocking strip firmly interconnected front upper corners of the side beams and separate from the upper cover and the front panel, a lower edge of said blocking strip is nearly close with a top surface of the tray.

5. The optical recording/reproducing apparatus as recited in claim 4, wherein the blocking strip is integrally attached to the side beams.

6. The optical recording/reproducing apparatus as recited in claim 5, wherein the front panel has wedged hooks extending toward the upper cover to fixedly engage with corresponding clasping holes of the upper cover.

7. The optical recording/reproducing apparatus as recited in claim 4, wherein the blocking strip is firmly and detachably fastened to said frame via a clasp and claw mechanism.

8. The optical recording/reproducing apparatus as recited in claim 7, wherein the front panel has wedged hooks extending toward the upper cover to fixedly engage with corresponding clasping holes of the upper cover.

9. The optical recording/reproducing apparatus as recited in claim 4, wherein the blocking strip is firmly and detachably fastened to said frame via screws.

10. The optical recording/reproducing apparatus as recited in claim 9, wherein the front panel has wedged hooks extending toward the upper cover to fixedly engage with corresponding clasping holes of the upper cover.

11. The optical recording/reproducing apparatus as recited in claim 4, wherein the blocking strip is firmly and detachably fastened to mounting slots of said frame.

12. The optical recording/reproducing apparatus as recited in claim 11, wherein the front panel has wedged hooks extending toward the upper cover to fixedly engage with corresponding clasping holes of the upper cover.

* * * * *